Jan. 30, 1968   L. ALAMPRESE   3,366,032
DAMPER APPARATUS INCLUDING INFLATABLE SEALING MEMBER
Filed Oct. 24, 1966
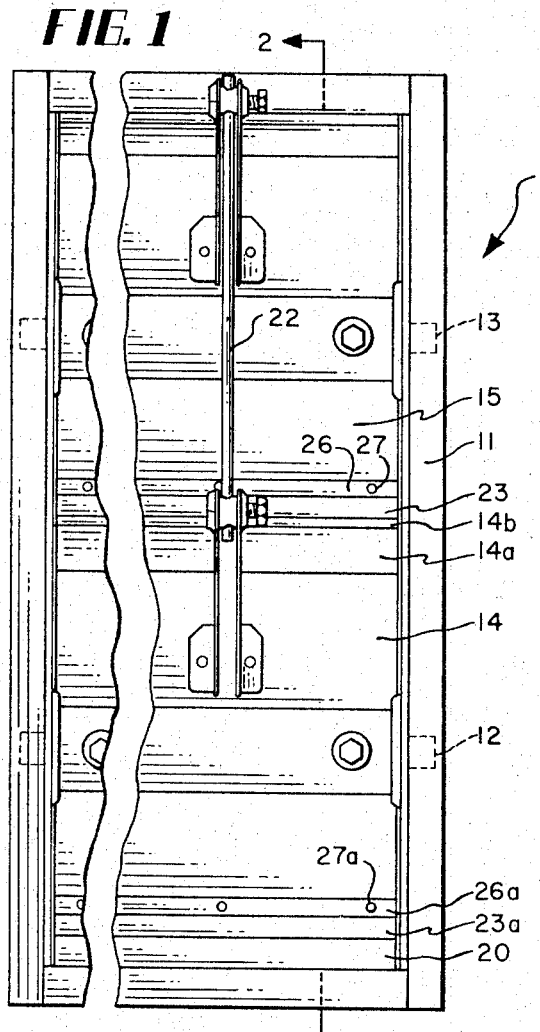
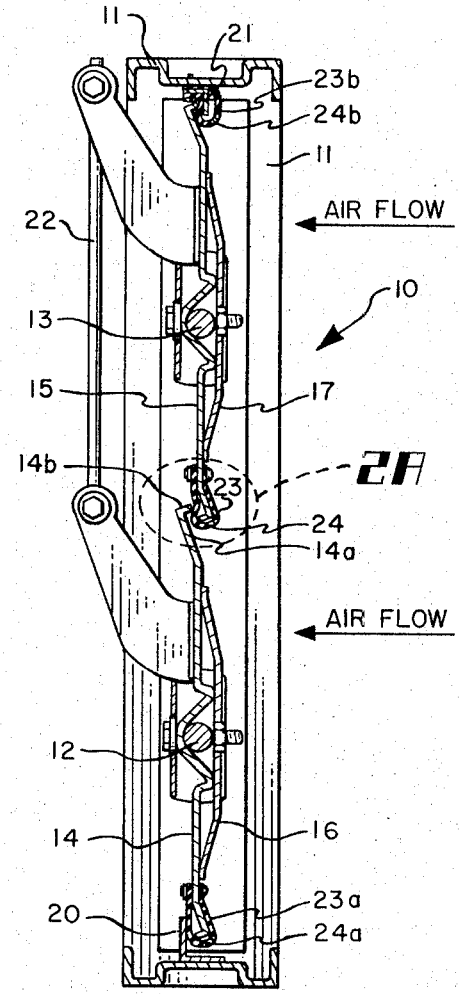
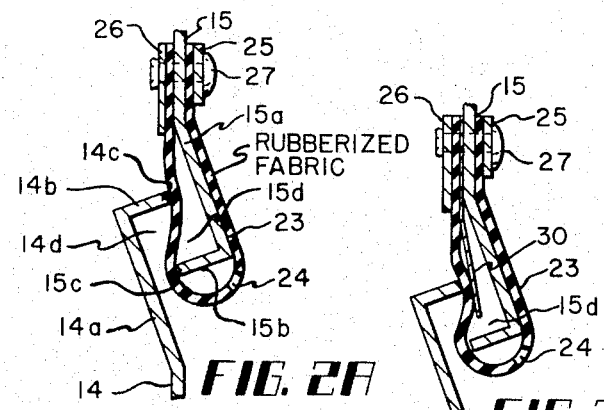
INVENTOR.
LEO ALAMPRESE
BY Donald R. Sjostrom
ATTORNEY

United States Patent Office 3,366,032
Patented Jan. 30, 1968

3,366,032
DAMPER APPARATUS INCLUDING
INFLATABLE SEALING MEMBER
Leo Alamprese, Wood Dale, Ill., assignor to Honeywell
Inc., Minneapolis, Minn., a corporation of Delaware
Filed Oct. 24, 1966, Ser. No. 588,958
8 Claims. (Cl. 98—121)

This invention relates to damper apparatus and more specifically to an air flow control damper with improved sealing means to reduce the leakage of air through the damper.

A longstanding problem in the manufacture of air flow control dampers has been the problem of controlling leakage between the damper blades and between the blades and the frame. It is extremely difficult to form the blades, which are normally formed of metal so that they will close tightly against each other even after they have been in use for a long period of time. The larger the damper is, the greater the problem tends to be. It is important that the leakage be kept to a minimum in order to reduce noise and to give good control where the controlled air flow is in a system such as a temperature control system.

It is well known to attach a strip of flexible material such as felt or rubber or the like, to the edge of the blade in an attempt to reduce the air leakage and these types of seals do in fact reduce the leakage. However, they have not been completely satisfactory, particularly after the material has been in use for some time. It has also been proposed to utilize dampers wherein the blades, or at least the edges thereof, are flexible and are rolled together to provide a seal between the blades. This is disclosed, for example, in the H. J. Scharres Patent No. 3,084,715. The Scharres patent also discloses a sliding flexible seal between the edges of the blades and the frame. There a flexible member is mounted in the frame and is inflatable by upstream pressure to provide a tight seal against the edge of the blade. This sealing arrangement has also been found to contain certain problems. One of the major problems is the fact that the frictional engagement between the edges of the blades and the sealing member carried by the frame increases substantially as the blade approaches its closed position. Thus, the amount of torque required to close the blades increases substantially as the sealing member inflates and a substantial torque is also required to reopen the blades. The deflection of the blades due to their rolling together also results in an increased torque requirement in order to open and close them. Further, the sliding movement between the engaging members, particularly between the blades and the sealing member on the frame, may result in undesired wear. These problems would not be overcome by having the flexible, inflatable member mounted on the edge of the blade in the manner disclosed in a butterfly valve in the F. H. Rogers Patent 1,834,870 wherein an inflatable seal is mounted either on the valve body and slidably engaged by the rotary valve closure member, or mounted on the edge of the closure member and slidingly engages a surface on the valve body. The problems of wear and friction requiring high torques seem to be inherent in any arrangement wherein the closure member slides inside of a cooperating member in order to close; that is, wherein the members come together so that the relative movement therebetween is generally parallel to the engaging surfaces when they close.

My invention provides a greatly improved seal in a damper assembly of the type wherein a pair of cooperating members, such as two blades or a damper blade and a fixed portion of the frame, are disposed in generally parallel relationship and with longitudinal edges disposed in overlapping abutting relationship to define a closed position of the assembly and wherein either one or both of the cooperating members is rotatable to an open position. The improved sealing arrangement includes an elongated hollow flexible sealing member which is carried by one of the overlapping cooperating members along its longitudinal edge, and with the sealing member being constructed and positioned so that a portion of it is disposed between and engaged by the overlapping members when the blade is in its closed position. The sealing member and the overlapping cooperating members are constructed and arranged so that relative movement between portions of the sealing member and of the cooperating member which engage each other is generally normal to the surface of the sealing member during that portion of their movement when they are in engagement during opening and closing of the blade. A portion of the sealing member is exposed to upstream pressure and a portion to downstream pressure when the blade is closed and the interior of the sealing member is connected to upstream pressure so that when the members are closed the sealing member is inflated to improve the seal between the cooperating members. Thus, the sealing member conforms with the contour of the cooperating member which it engages to insure that a tight seal is provided.

It can be seen that my invention provides a good seal which is readily usable in a conventional damper of the type wherein the blades overlap when they are in closed position and wherein there are no sliding frictional forces between the blades or between the blades and the sealing member on the frame. This results in a minimum of wear and in no substantial addition in the amount of torque required to open and close the blades over that which would be necessary in a conventional damper of this type.

Various objects and advantages of the invention, in addition to those mentioned above, will be apparent upon reading the following detailed description of a preferred embodiment thereof wherein reference is made to the drawing. In the drawing:

FIGURE 1 is an elevational view of a damper assembly utilizing my invention;

FIGURE 2 is a cross sectional view of the damper assembly taken generally along line 2—2 of FIGURE 1;

FIGURE 2A is a greatly enlarged fragmentary view taken generally as indicated on FIGURE 2; and FIGURE 2B is a greatly enlarged fragmentary view generally similar to FIGURE 2A but disclosing a somewhat modified form of the invention.

Referring to FIGURES 1 and 2, numeral 10 generally designates a damper assembly having a relatively rigid, generally rectangular frame 11 with a central air flow passage therethrough. Pivotally mounted within the frame, on axles 12 and 13, respectively, are a pair of damper blades 14 and 15. The blades may be attached to the axles by any appropriate means such as by members 16 and 17 associated with dampers 14 and 15, respectively. As can best be seen in FIGURE 2, the damper blades are generally flat and extend, on opposite sides of the axle, substantially in a single flat plane. The blades have two longitudinal edges extending generally parallel to their axles and adjacent these longitudinal edges, each of the blades is reverse bent as illustrated best in FIGURES 2A and 2B. For example, a longitudinal portion 15a of blade 15 is bent so it forms an acute angle with the plane of the blade and then a further longitudinal portion 15b, immediately adjacent the longitudinal edge 15c of the blade, is bent in the opposite direction so that the edge 15c lies substantially in the plane of the blade. This construction results in a longitudinal groove or recess 15d adjacent portions 15a and 15b. Blade 14 may be formed in a similar manner as indicated by the numerals 14a, 14b, 14c and 14d. This type of damper construction is well known in the art as is the illustrated arrangement of the damper blades 14 and 15 wherein they overlap to define a closed position of the damper to shut off air flow through the passage.

As seen in FIGURE 2, the damper blades lie substantially in a single plane with their longitudinal edges lying in overlapping abutting relationship when the blades are closed. In order to provide a seal between the outer edges of the damper blades and the frame 11, appropriate abutment members 20 and 21 are provided for cooperation with dampers 14 and 15, respectively. The abutment members have been illustrated as L-shaped members with one portion attached to the frame and with another portion extending transverse to the direction of the air flow and generally parallel to the plane of the dampers when they are closed. It will be noted that with the dampers in their closed position, one of the longitudinal edges thereof lies in overlapping abutting relationship with a portion of the cooperating abutment member.

Damper blades 14 and 15 are connected together by an appropriate linkage generally designated by the numeral 22 and in turn may be connected by appropriate means (not shown) to a motor or other driving means (not shown) for operating the damper.

The structure described thus far is a standard construction utilized in a large number of commercially available dampers. As indicated previously herein, one of the problems which has existed in this type of damper heretofore has been the problem of providing an adequate air seal between adjacent damper blades and between the blades and the frame. Hereinafter, the term cooperating members shall refer to any two members, whether they be adjacent damper blades or a damper blade and an abutment member affixed to the frame, which are disposed in overlapping abutting relationship when the damper assembly is in its closed position.

I have substantially overcome the air leakage problem in this type of damper assembly by providing on one of each two cooperating members an elongated, hollow, flexible sealing member 23 carried by the member along its longitudinal edge. This sealing member is disposed so that when the cooperating members are in their closed position, a portion of the sealing member is disposed between the overlapping abutting portions of the cooperating members. It is further disposed so that part of it is exposed to air upstream of the cooperating members and a significant part of it to air downstream. In the portion of the member which is disposed upstream of the cooperating member, there are a plurality of perforations or air inlet openings 24 spaced longitudinally along the sealing member. Sealing member 23 is sufficiently flexible so that, as the cooperating members are closed upstream, air entering through the perforations 24 inflates the portion of the sealing member which is exposed on its exterior to downstream pressure, causing it to provide a tight seal between the two cooperating members. Thus the inflatable member is made to conform to any irregularities or distortions in the cooperating members to provide a substantially better seal than previous sealing arrangements.

While it is essential only that the sealing member be disposed along one of the longitudinal edges of each two cooperating members, that it have a portion disposed between the members when they are in closed position, that it be sufficiently flexible so that it can be readily inflatable by upstream pressure, and that it have the means connecting the interior to upstream pressure, I prefer to use the structure best seen in FIGURE 2A. As disclosed therein, sealing member 23 comprises an elongated strip of relatively thin, flexible, rubberized fabric which is looped over the longitudinal edge of the damper blade, extending over recess 15d, and is attached to the blade by a fluid-tight fastening means. For example, I have used a metallic strip 25 disposed on one side of the blade and a further metallic strip 26 disposed on the other side of the blade and a plurality of rivets 27 extending through the metallic strips, the double thickness of the rubberized fabric, and the blade. At the ends of the cooperating members, the sealing member is closed by appropriate means (not shown). As the blades close, edge 14c of blade 14 intersects, at substantially right angles, the portion of member 23 which overlies longitudinal recess 15d. Upstream air enters member 23 and inflates the portion thereof which is exposed to downstream pressure on the outside so that member 23 conforms to the contour of edge 14c and provides a tight seal therewith. With the construction described above, the entrapped edge of the blade acts as a back-up member for the relatively thin sealing member when the blades close and thus reduces the wear on the sealing member. It also helps to maintain the shape of the sealing member.

As illustrated in FIGURE 2, this sealing arrangement may be used between adjacent damper blades as illustrated by sealing member 23 carried by damper blade 15 and providing a seal between blades 14 and 15. The seal may also be carried by a damper blade and provide a seal between the blade and the damper frame. This is illustrated by the sealing member 23a carried by blade 15 and cooperating with fixed abutment member 20. In addition, the same sealing arrangement may be utilized by having the sealing member fixed to the frame. This is illustrated in FIGURE 2 by a sealing member 23b which is carried by abutment member 21 and provides a seal between this abutment member and the upper edge of blade 15.

A slightly modified form of the invention is disclosed in FIGURE 2B wherein the structure is similar to that in FIGURE 2A except that an elongated leaf spring member 30 is disposed inside the sealing member 23. Leaf spring 30 extends substantially the length of the damper blade and is affixed to the blade as by having rivets 27 extend therethrough. It thus lies substantially in the plane of the blade and extends over longitudinal recess 15d provided by the reverse bend in the edge of the damper blade. The leaf spring is disposed so that it acts as a spaced resilient backing member for that portion of the sealing member 23 which is deflected inwardly when the cooperating members assume their closed position. It has been found that by adding the leaf spring in the manner described the flexure of this portion of the sealing member is reduced and the wear thereon is substantially reduced. It also serves to maintain the shape of the sealing member and prevent it from taking a set as might otherwise occur if the blades remained closed for a long period of time.

It will be apparent that the inflatable sealing arrangement described herein will provide a good seal to prevent air leakage between cooperating members in the damper without interfering with the operation of the damper between open and closed positions. As can best be seen in FIGURES 2A and 2B, the relative movement between the portions of the sealing member and of the cooperating members which engage each other is substantially at right angles so there is little or no sliding friction between these members during that portion of their movement when they are in engagement. Therefore, the amount of torque required to open or close the blades is substantially the same as it would be if the seal were not present. Also, since there is little or no sliding friction between the sealing member and the abutting portion of the other cooperating member, there is only a minimum amount of wear on the sealing member. Thus, the invention provides a greatly improved seal which has a relatively long life and which does not substantially alter the operating characteristics of the damper assembly.

In the above description a preferred embodiment of my invention and one modification thereof have been described for purposes of illustration. It has been disclosed in a damper with parallel action blades wherein all blades rotate in the same direction. It is equally applicable to opposed action dampers wherein adjacent blades rotate in opposite directions. Various modifications may become apparent to those skilled in the art in view of my disclosure herein. Therefore, the invention is to be limited solely by the scope of the appended claims.

The embodiments of the invention in which an exclusive property or right is claimed are defined as follows:

1. In a damper assembly of the type having a frame with an air flow passage therethrough, a pair of cooperating members in the frame each having a surface and a longitudinal edge portion, the members being disposed in a generally parallel relationship and with the longitudinal edge portions in overlapping abutting relationship to define a closed position of the assembly and to define an upstream side and a downstream side of the members in the passage, and at least one of the cooperating members being a damper blade rotatable in the frame to an open position, the improvement comprising: an elongated, hollow flexible sealing member carried by one of said overlapping cooperating members along the longitudinal edge portion thereof, said sealing member being so constructed and so positioned that a portion of it is disposed between and engaged by the overlapping cooperating members when the blade is in its closed position and with a portion of its surface exposed to air upstream of the members and another portion exposed to air downstream of the members, said sealing member and said overlapping cooperating members being so constructed and arranged that relative movement between the portions of the sealing member and of the other cooperating member which engage each other, while they are in engagement during opening and closing of the blade, is generally normal to the surface of said sealing member; and means connecting the interior of said sealing member to the air upstream of said members so that upstream pressure inflates said sealing member to improve the seal between said cooperating members when the blade is in its closed position.

2. The damper assembly of claim 1 wherein each of the cooperating members is a damper blade rotatable between open and closed positions and the sealing member is effective to reduce air leakage between the blades.

3. The damper assembly of claim 1 wherein the other of the cooperating members is an abutment member fixed with respect to the frame and extending into the passage transverse to the direction of air flow, and the blade overlaps an edge of the member when in the closed position, the sealing member being effective to reduce air leakage between the blade and the frame.

4. The damper assembly of claim 1 wherein the cooperating member carrying said sealing member is generally flat and relatively thin adjacent the said longitudinal edge portion and wherein said sealing member comprises an elongated strip of relatively thin, flexible material looped over said edge portion and sealingly fastened on each side to form an inflatable bag-like edge seal to reduce air leakage between the members when the assembly is in its closed position.

5. The damper assembly of claim 2 wherein the blades are relatively thin and generally rectangular in shape; wherein the blades are reverse bent along each longitudinal edge to provide a longitudinal recess on the surface thereof along such edges, the blades being positioned and the reverse bends so formed that the edge of one blade intersects the next adjacent blade along said recess when the blades are closed; and wherein said sealing member surrounds one edge of said one blade and encloses the longitudinal recess therealong.

6. The damper assembly of claim 4 wherein said sealing member is constructed from a rubberized fabric with a plurality of relatively small, spaced openings therethrough and disposed to connect the interior of said sealing member to the upstream side of the members when the assembly is in its closed position.

7. The damper assembly of claim 4 wherein an elongated leaf spring member is disposed inside said sealing member, extending longitudinally along substantially the length of said longitudinal edge, said spring member being carried by said one cooperating member and lying generally in the plane thereof and positioned so that said spring member acts as a spaced resilient backing for the portion of said sealing member which is engaged by the other of said cooperating members when the assembly is closed.

8. The damper assembly of claim 5 wherein an elongated leaf spring member is disposed inside said sealing member, extending longitudinally along substantially the length of the blade, generally in the plane of the blade, and along and partially overlying the longitudinal recess along said one edge of said blade so that the spring member acts as a spaced resilient backing for the portion of said sealing member which is engaged by an edge of the next adjacent blade when the blades are closed.

References Cited
UNITED STATES PATENTS

| | | | |
|---|---|---|---|
| 2,311,950 | 2/1943 | Mader | 49—91 XR |
| 3,046,619 | 7/1962 | Shustrom | 49—91 XR |
| 3,084,715 | 4/1963 | Scharres | 98—110 XR |
| 3,198,298 | 8/1965 | Ferris | 49—91 |

ROBERT A. O'LEARY, *Primary Examiner.*

M. A. ANTONAKAS, *Assistant Examiner.*